United States Patent
Poster et al.

(10) Patent No.: US 11,181,187 B2
(45) Date of Patent: Nov. 23, 2021

(54) PLANETARY GEAR CARRIER WITH HARDENED POSTS

(71) Applicant: Bell Helicopter Textron Inc., Forth Worth, TX (US)

(72) Inventors: Scott David Poster, Arlington, TX (US); Charles Hubert Speller, Jr., Flower Mound, TX (US)

(73) Assignee: TEXTRON INNOVATIONS INC., Providence, RI (US)

( * ) Notice: Subject to any disclaimer, the term of this patent is extended or adjusted under 35 U.S.C. 154(b) by 518 days.

(21) Appl. No.: 15/967,843

(22) Filed: May 1, 2018

(65) Prior Publication Data

US 2019/0338847 A1    Nov. 7, 2019

(51) Int. Cl.
| | |
|---|---|
| *F16H 57/08* | (2006.01) |
| *C21D 9/32* | (2006.01) |
| *F16H 1/28* | (2006.01) |
| *B64C 27/12* | (2006.01) |
| *C23C 8/20* | (2006.01) |
| *C23C 8/24* | (2006.01) |

(52) U.S. Cl.
CPC ........... *F16H 57/082* (2013.01); *B64C 27/12* (2013.01); *C21D 9/32* (2013.01); *F16H 1/28* (2013.01); *C23C 8/20* (2013.01); *C23C 8/24* (2013.01); *F16H 2057/085* (2013.01)

(58) Field of Classification Search
CPC .. B64D 35/00; B64D 35/08; B64D 2045/009; B64C 27/12; F16H 57/082; F16H 57/032; C21D 1/06; C21D 1/18; C21D 9/32; C23C 8/20; C23C 8/24
See application file for complete search history.

(56) References Cited

U.S. PATENT DOCUMENTS

| | | | | |
|---|---|---|---|---|
| 6,042,499 A | * | 3/2000 | Goi | B64C 27/12 475/214 |
| 6,562,151 B2 | * | 5/2003 | Hirakawa | C23C 8/26 148/318 |
| 6,702,070 B2 | * | 3/2004 | Smith | B60K 7/0015 188/250 G |
| 9,218,693 B2 | | 12/2015 | Hale et al. | |
| 9,255,626 B2 | | 2/2016 | Bouwer et al. | |
| 2010/0197445 A1 | | 8/2010 | Montestruc | |

FOREIGN PATENT DOCUMENTS

| | | |
|---|---|---|
| DE | 19900397 A1 | 7/2000 |
| EP | 1857712 A1 | 11/2007 |

(Continued)

OTHER PUBLICATIONS

European Patent Office, European Search Report for EP Appl. No. 18181812.1 dated Jan. 28, 2019, 37 pp.

(Continued)

*Primary Examiner* — Erin D Bishop
(74) *Attorney, Agent, or Firm* — Edwin S. Flores; Daniel J. Chalker; Chalker Flores, LLP (57) ABSTRACT

A planetary gear system includes a planetary gear carrier having three or more posts extending from the planetary gear carrier, each post having a hardened exterior surface, and a planet pinion gear in contact with the hardened exterior surface of each post.

22 Claims, 4 Drawing Sheets

(56) References Cited

FOREIGN PATENT DOCUMENTS

JP       2003227550 A     8/2003
JP       2007321866 A    12/2007

OTHER PUBLICATIONS

Bell Helicopter Textron Inc., "Bell 525 Relentless" Poster, Nov. 12, 2014.
Perry, Dominic , "Analysis: Bell 525 Relentless cutaway and Technical Description" Flight International, Nov. 14, 2014, London, https://www.flightglobal.com/news/articles/analysisbell525relentlesscutawayandtechnical405541/.
European Patent Office, Communication pursuant to Article 94(3) EPC for EP Appl No. 18181812.1 dated Aug. 21, 2020, 4 pp.

\* cited by examiner

PLANETARY GEAR CARRIER WITH HARDENED POSTS

CROSS-REFERENCE TO RELATED APPLICATIONS

This patent application is related to U.S. patent application Ser. No. 15/702,882 filed on Sep. 13, 2017 entitled "Flange-Mounted Ring Gear for Improved Heat Management", U.S. patent application Ser. No. 15/434,609 filed on Feb. 16, 2017 entitled "System and Apparatus for Supporting a Planetary Carrier within a Gearbox", U.S. provisional patent application Ser. No. 62/399,067 filed on Sep. 23, 2016 entitled "Improved Helicopter Transmission System", and U.S. provisional patent application Ser. No. 62/423,371 filed on Nov. 17, 2016 entitled "Improved Helicopter Transmission System," all of which is hereby incorporated by reference in its entirety.

STATEMENT OF FEDERALLY FUNDED RESEARCH

Not applicable.

TECHNICAL FIELD OF THE INVENTION

The present invention relates in general to the field of gears for rotorcraft, and more particularly, to planetary gear carriers with hardened posts.

BACKGROUND OF THE INVENTION

Without limiting the scope of the invention, its background is described in connection with rotorcraft drive systems.

Since their inception, rotorcraft and rotorcraft drive systems have been improved to reduce the possibility of failure during flight. Toward that end, a number of modifications have been made to drive systems to improve reliability. However, despite advances in materials and design, a number of failures continue to occur that affect rotorcraft performance. One example of a problem with current rotorcraft drive systems is that, in some instances, the failure of single drive system component leads to failure of the entire drive system. Another example is a loss of lubrication event that causes the loss of torque transmission by drive system subcomponents such as gearboxes or accessories connected to the main rotor gearbox.

More particularly, the failure of a single gearbox or shaft connected to the main rotor gearbox can significantly impact operations. For example, if there is a loss of lubrication to a gearbox, the gearbox loses torque transmission, causing damage to upstream or downstream components. The same can occur when a shaft becomes unbalanced (or breaks), which can damage couplings, gearboxes and even the main rotor gearbox. Unfortunately, when a portion of a drive system experiences a failure or reduction in performance, the concomitant reduction in power leads to challenges with flight performance.

Thus, a need remains for improving the overall safety and reliability of rotorcraft drive systems that include the connections between the engines and the main rotor gearbox, reduction and accessory gearboxes, shafts, generators, oil pumps, and accessories connected to the main rotor gearbox. Prior art rotorcraft drive system use gearing systems that are susceptible to wear, requiring frequent maintenance and servicing, driving operations costs up and providing potential failure points that decrease safety.

One example is U.S. Pat. No. 9,255,626, issued to Bouwer, et al., entitled "Rotorcraft and Planetary Gear Systems". This patent is said to teach planetary gear systems, transmissions, and apparatuses that include at least one non-fixed annular gear, at least one non-fixed sun gear, at least one compound planet gear meshed between the at least one non-fixed annular gear and the at least one non-fixed sun gear, and at least one fixed gear meshed with the at least one compound planet gear. In operation, the rotational input to one of the at least one non-fixed annular gear and the at least one non-fixed sun gear results in an opposite rotational output of the other of the at least one non-fixed annular gear and the at least one non-fixed sun gear.

Another example is shown in U.S. Pat. No. 9,218,693, issued to Hale, et al., entitled, "Drive System Power Measurement and Diagnostic System". Briefly, these inventors teach an apparatus comprising a housing, a gearing system disposed within the housing and a plurality of targets, a plurality of sensors incorporated within the housing, a processor in electrical signal communication with the sensors, and a user interface in signal communication with the processor. These inventors also teach a method for use with the invention that comprises providing a drive system comprising a drive system power measuring and diagnostic system, wherein the drive system is configured to rotate one or more components comprising a plurality of targets, sense the targets with a sensor pair, thereby producing a data signal, process the data signal from the one or more sensor pairs, thereby producing a processed data signal, and output the processed data signal to a user.

The drawbacks of prior art gearing systems make systems and methods of gearing that are not as susceptible to wear desirable.

SUMMARY OF THE INVENTION

In one embodiment, the present invention includes a planetary gear system having a planetary gear carrier having three or more posts extending from the planetary gear carrier, each post having a hardened exterior surface, and a planet pinion gear in contact with the hardened exterior surface of each post. In one aspect, the planetary gear system includes a bearing system within each planet pinion gear, wherein the bearing system is in contact with the hardened exterior surface of the post. In another aspect, the hardened exterior surface of the post is hardened in situ. In yet another aspect, the hardened exterior surface of the post is hardened by tempering and quenching, carbonization, nitriding, or local hardening. In another aspect, the hardened exterior surface of the posts comprises a hardening coating disposed on the post or a hardening material implanted into the post. In yet another aspect, the planetary gear carrier comprises a single piece planetary gear carrier and the posts are integral with the single piece planetary gear carrier. In another aspect, the planetary gear system includes a planetary sun gear disposed between and engaging the planet pinion gears, and a compound bull gear connected to the planetary sun gear. In yet another aspect, the planetary gear system includes a rotor mast engaging a gear disposed in a top of the planetary gear carrier or other torque-carrying component. In another aspect, the planetary gear system comprises an overhung planetary gear system wherein the planetary gear carrier overhangs the planet pinion gears. In yet another aspect, the hardened exterior surface of the posts reduces wear on the posts caused by the planet pinion gear or any component thereof.

In another embodiment, the present invention includes a method of providing power to a rotorcraft by providing a main rotor gearbox coupling one or more engines to a rotor mast of the rotorcraft, and transmitting a power from the one or more engines to the rotor mast of the rotorcraft via the main rotor gearbox. The main rotor gearbox contains a planetary gear system including a planetary gear carrier having three or more posts extending from the planetary gear carrier, each post having a hardened exterior surface, and a planet pinion gear in contact with the hardened exterior surface of each posts. In another embodiment, a bearing system is provided within each planet pinion gear, wherein the bearing system is in contact with the hardened exterior surface of the post. In yet another aspect, the hardened exterior surface of the post is hardened in situ. In another aspect, the hardened exterior surface of the post is hardened by tempering and quenching, carbonization, nitriding, or local hardening. In yet another aspect, the hardened exterior surface of the post is hardened by coating the post with a hardening coating or implanting a hardening material into the post. In another aspect, the planetary gear carrier comprises a single piece planetary gear carrier and the posts are integral with the single piece planetary gear carrier. In yet another aspect, wear on the posts caused by the planet pinion gear or any component thereof is reduced as a result of using the hardened exterior surface of the posts.

In another embodiment, the present invention includes rotorcraft having a fuselage, one or more engines disposed within the fuselage, and a main rotor gearbox disposed within the fuselage and coupling the one or more engines to a rotor mast of the rotorcraft. The main rotor gearbox contains a planetary gear system comprising: a planetary gear carrier having three or more posts extending from the planetary gear carrier, each post having a hardened exterior surface, and a gear disposed in a top of the planetary gear carrier engaging the rotor mast or other torque-carrying component, a planet pinion gear in contact with the hardened exterior surface of each post, a planetary sun gear disposed within the main rotor gearbox between and engaging the planet pinion gears, and a compound bull gear disposed within the main rotor gearbox, engaging the planetary sun gear, and coupled to the one or more engines. In another aspect, the main rotor gearbox includes a bearing system within each planet pinion gear, wherein the bearing system is in contact with the hardened exterior surface of the post. In yet another aspect, the hardened exterior surface of the post is hardened in situ. In another aspect, the hardened exterior surface of the post is hardened by tempering and quenching, carbonization, nitriding, or local hardening. In yet another aspect, the hardened exterior surface of the posts comprises a hardening coating disposed on the post or a hardening material implanted into the post. In another aspect, the planetary gear carrier comprises a single piece planetary gear carrier and the posts are integral with the single piece planetary gear carrier. In yet another aspect, the planetary gear overhangs the planet pinion gears. In another aspect, the hardened exterior surface of the posts reduces wear on the posts caused by the planet pinion gears or any component thereof. In yet another aspect, one or more reduction gearboxes couple to the one or more engines to the main rotor gearbox

BRIEF DESCRIPTION OF THE DRAWINGS

For a more complete understanding of the features and advantages of the present invention, reference is now made to the detailed description of the invention along with the accompanying figures and in which.

DETAILED DESCRIPTION OF THE INVENTION

Illustrative embodiments of the system of the present application are described below. In the interest of clarity, not all features of an actual implementation are described in this specification. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

In the specification, reference may be made to the spatial relationships between various components and to the spatial orientation of various aspects of components as the devices are depicted in the attached drawings. However, as will be recognized by those skilled in the art after a complete reading of the present application, the devices, members, apparatuses, etc. described herein may be positioned in any desired orientation. Thus, the use of terms such as "above," "below," "upper," "lower," or other like terms to describe a spatial relationship between various components or to describe the spatial orientation of aspects of such components should be understood to describe a relative relationship between the components or a spatial orientation of aspects of such components, respectively, as the device described herein may be oriented in any desired direction.

The present invention was developed to address the wear and premature part replacement common to rotorcraft drive systems and is based on a completely new design and application of new technology to rotorcraft safety.

Figure 1:
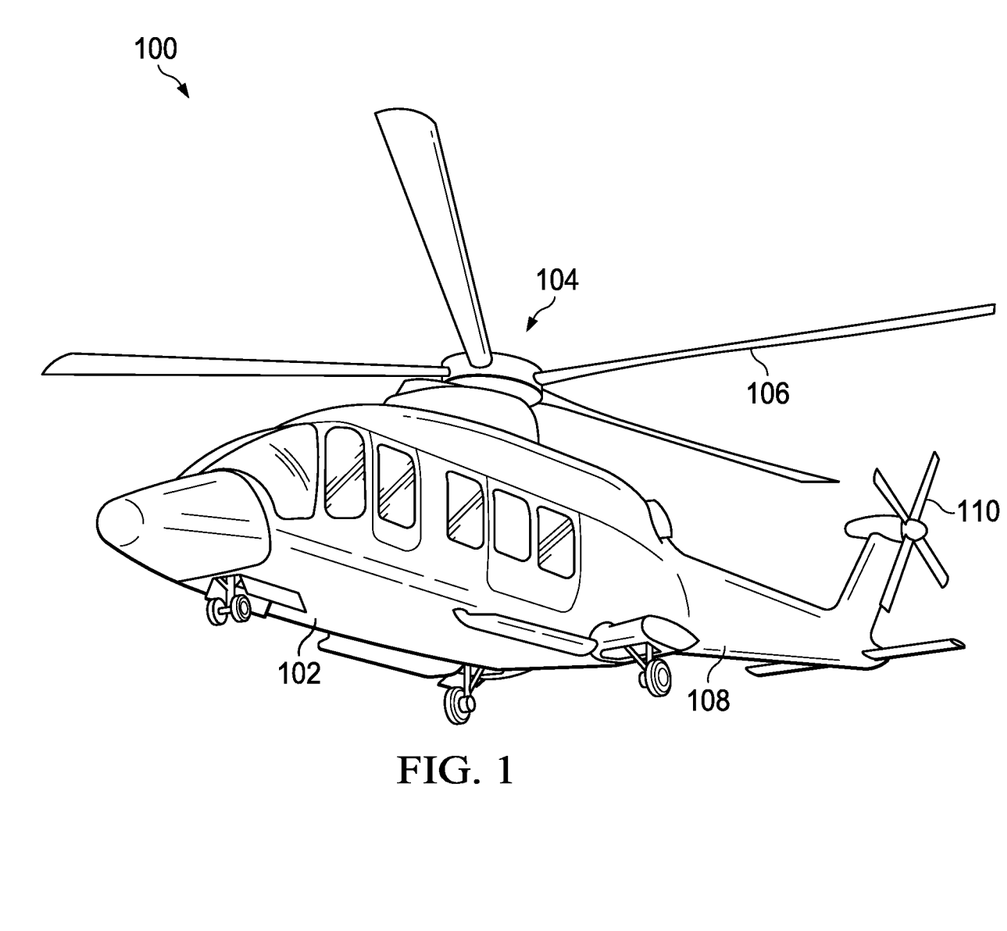
FIG. 1 shows a side view of a helicopter according to a preferred embodiment of the present application.

FIG. 1 shows an aircraft 100 in accordance with a preferred embodiment of the present application. In the exemplary embodiment, aircraft 100 is a rotorcraft having a fuselage 102 and a rotor system 104 carried thereon. A plurality of rotor blades 106 is operably associated with a rotor system 104 for creating flight. A tail boom 108 is depicted that further includes tail rotor 110.

Figure 2:
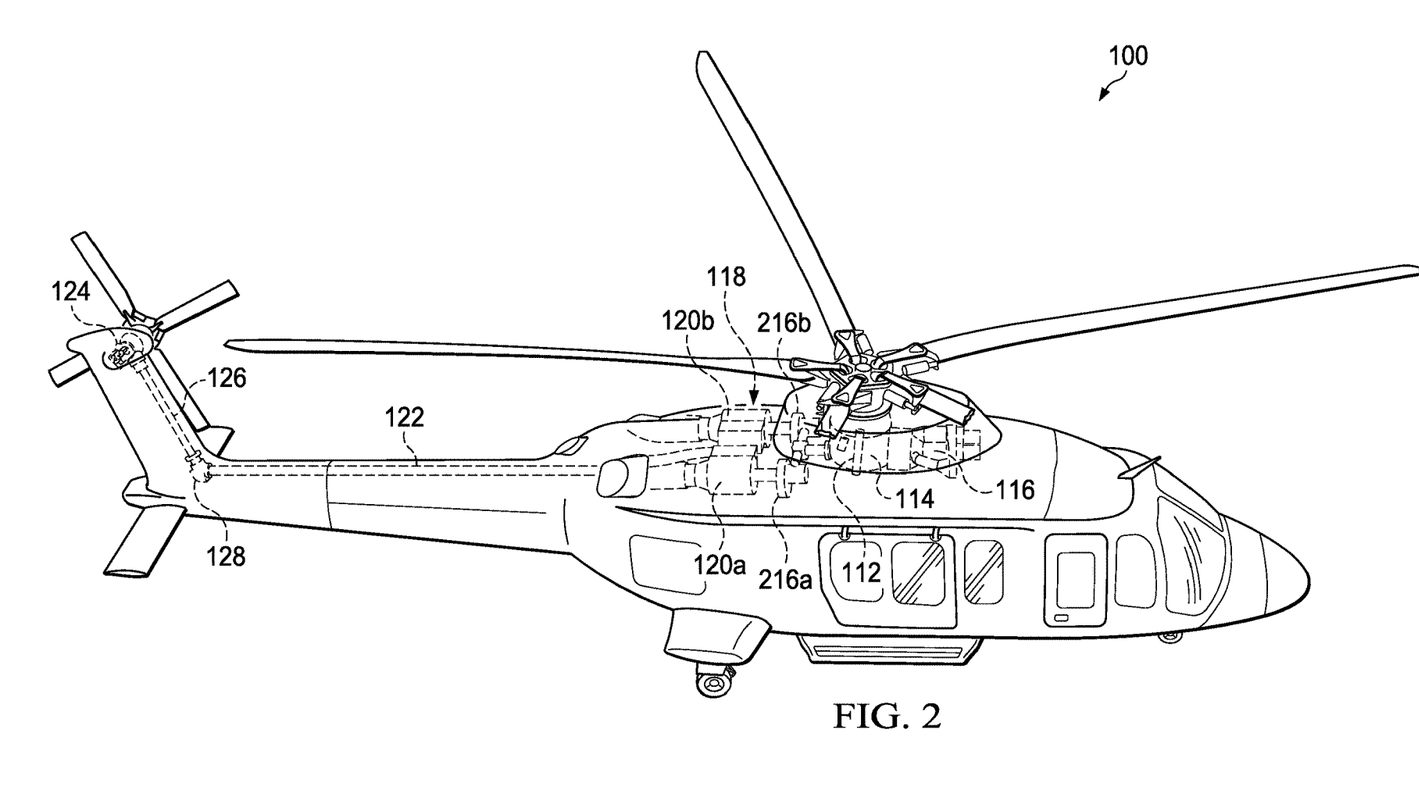
FIG. 2 shows a partial cross-section, perspective view of helicopter aircraft according to an alternative embodiment of the present application.

For example, FIG. 2 shows a partial cross-section perspective view of aircraft 100 that includes additional detail of the present invention. Aircraft 100 further includes a main rotor mast 112, which is connected to the main rotor gearbox (MRGB) 114. The MRGB 114 is connected to one or more accessory gear boxes 116, one or more reduction gearboxes (RGB) 216a, 216b, hydraulic pump(s) and generator(s). Each RGB 216a, 216b is connected to one or more engines 120a, 120b, which are within an engine compartment 118. A tail rotor drive shaft 122 transmits mechanical rotation to the tail rotor gearbox 124, which is connected via tail rotor drive shaft 126 and intermediate gear box 128.

The drive system and subcomponents of aircraft 100 were developed to address the failures common to rotorcraft drive systems and is based on a completely new design and application of new technology to rotorcraft safety. More particularly, the new rotorcraft drive system is focused in an unparalleled manner on safety and redundancy. The goal of safety drove the design and development of the unique layout and configuration of the rotorcraft drive system described herein, which incorporates unique features and system separation that protects primary aircraft systems from the most common drive system failures. The drive system has also been designed to maximize the operational capability in the event of an uncommon failure, such as a loss of lubrication.

The drive system and subcomponents of aircraft 100 overcome many drive system failures by including one or more of the following design features: (1) minimize the number of single path drive system components; (2) provide maximum system separation and redundancy; (3) minimize maintenance requirements and maintenance related incidents; (4) minimize the potential of loss of lubrication events; and/or (5) maximize main rotor gearbox loss of lubrication capability. The rotorcraft drive system includes, e.g., dual engine reduction gearboxes completely isolated from the remainder of drive system via freewheeling clutches in the main rotor gearbox, dual accessory gearboxes separate from the main rotor gearbox, and the distribution of the gearbox driven accessories among the separate systems, among other improvements.

High-speed gearing and the associated heat generation is always an area of concern for gearbox survivability. The ability to continue torque transmission, particularly in a loss of lubrication scenario, is of great importance. For this reason, the drive system includes two separate RGB's, each one connected to a separate engine and independent from the MRGB. The reduction gearboxes are fully self-contained and separate from each other, each reducing the engine output speed from a high speed at or near turbine engine speed of greater than 10,000 RPM to a speed substantially lower than the high speed, a low speed of less than about 6,000 RPM prior to transmitting torque to the MRGB. Each RGB has its own self-contained lubrication system consisting of pump, filter, oil monitoring sensors, and a unique core in the aircraft cooler assembly. With this drive system arrangement high-speed gearing is contained in separate gearboxes, as such, the survivability of the total drive system is greatly enhanced, particularly in the event of high-speed gear failure or loss of lubricant in an individual RGB. The use of independent RGBs that connect to a single low speed overhung planetary gear system in the MRGB reduces rotating part count and heat generation. With maintenance in mind, the drive system allows for a short mast top case assembly that allows swapping of the top case and mast without removal of the main rotor gearbox from the aircraft. The MRGB also includes a clutch for each of the reduction gearboxes that allows each reduction gearbox to be separately and independently disconnected from the MRGB.

The drive system of aircraft 100 can also take advantage of a number of additional features that minimize the possibility of loss of lubricant and to maximize the operational time if a loss of lubricant event does occur. For example, the drive system can also include one or more of the following: (1) the use of transfer tubes for cooler and filter mounting to eliminate the loss of lubricant in the event of loss of attachment fastener torque; (2) using an oil cooler mounted directly to the MRGB eliminating external hoses; (3) the use of all oil filter bowls are screw-on instead of held-on with small fasteners eliminating fastener failure issue from repeated removals; (4) the elimination of a high speed planetary and the heat generation associated with it during a loss of lubrication event; (5) the use of gear tooth geometry specifically designed to minimize sliding reducing heat generation at the teeth and the tendency to score during a loss of lubrication event; (6) the use of coarse pitch power gears with clearance or backlash allowing for the expansion during high heat loss of lubrication events; (7) the use of high hot hardness material utilized for primary torque-carrying components maximizing their continued operation in the event of a loss of lubrication event; (8) the use of ring gear and case joint design to efficiently transmit heat away from the planetary gears in the event of a loss of lubrication event; and/or (9) the use of isotropic super finished gear teeth resulting in a greatly improved surface finish and maximizing the ability of these gears to operate in a reduced lubrication environment.

Figure 3:
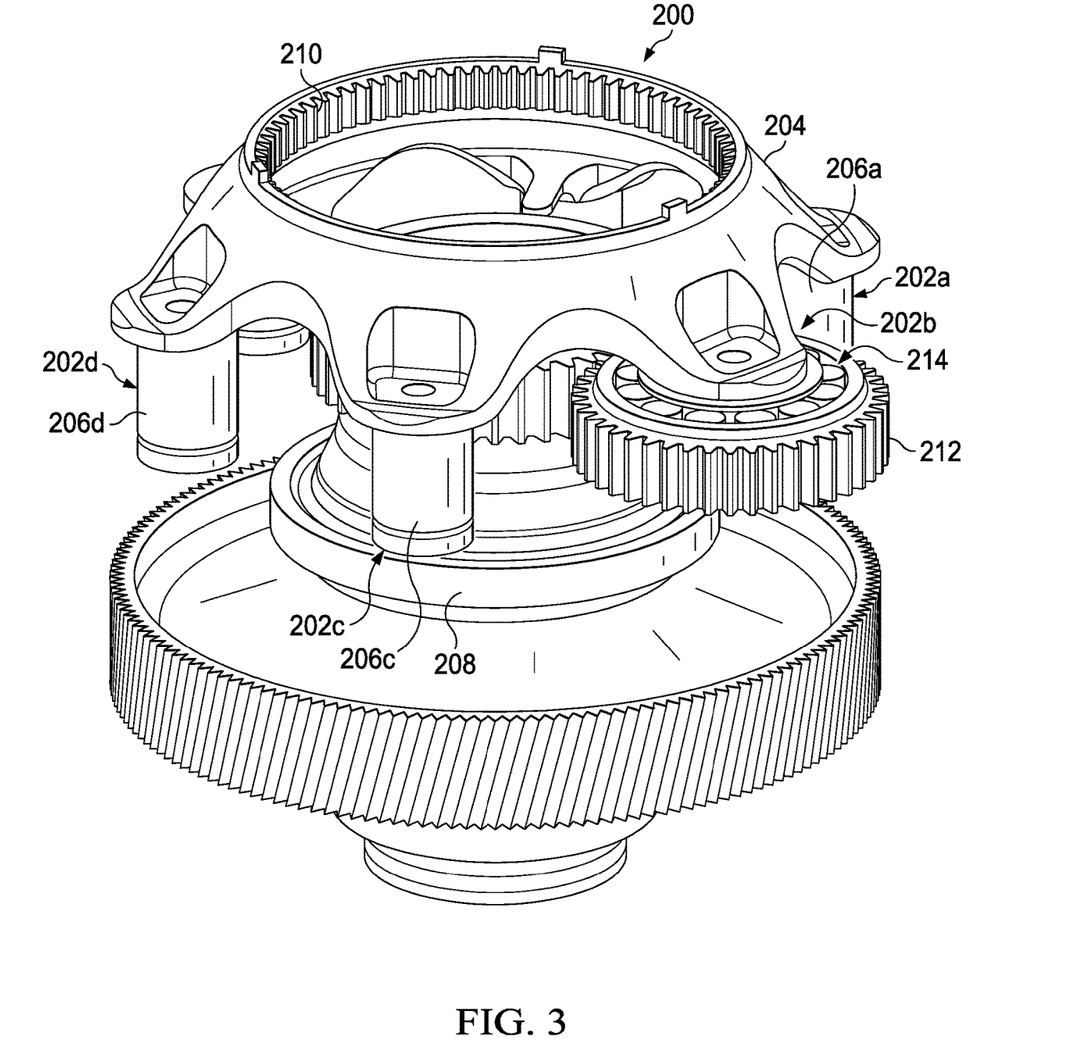
FIG. 3 is an isometric view of a planetary gear of the present application.

FIG. 3 is an isometric view of a planetary gear system 200 of the present invention. The planetary gear system 200 includes a plurality of posts 202a, 202b, 202c, 202d (e.g., 2, 3, 4, 5, 6, 7, 8, 9, 10 or more posts) connected to and extending from a planetary gear carrier 204. In certain specific embodiments, the posts 202a, 202b, 202c, 202d, etc., are integral with the planetary gear carrier 204 to form a single piece planetary gear carrier. Each post 202a, 202b, 202c, 202d, etc. has a hardened exterior surface 206a, 206b (not visible), 206c, 206d, etc. A planet pinion gear 212 is in contact with the hardened exterior surfaces 206a, 206b (not visible), 206c, 206d, etc. of each post 202a, 202b, 202c, 202d, etc. Each planet pinion gear 212 may include a bearing system 214 that is in contact with the hardened exterior surface 206a, 206b (not visible), 206c, 206d, etc. of each post 202a, 202b, 202c, 202d, etc. As shown, the planetary gear system 200 is an overhung planetary gear system wherein the planetary gear carrier 204 overhangs the planet pinion gears 212. Other orientations can be used.

A key feature of the present invention is hardening the exterior surface 206a, 206b (not visible), 206c, 206d, etc. of the posts 202a, 202b, 202c, 202d, etc. to reduce the wear on the posts 202a, 202b, 202c, 202d, etc. and extend the life of the planetary gear system 200. By hardening the surface of the posts 202a, 202b, 202c, 202d, etc., the overall planetary gear system 200 has a longer useful life, thus decreasing the frequency of replacement. However, another feature is that the planetary gear carrier 204 is not hardened, thereby providing increased flexibility for the rest of the planetary gear system 200. Thus, the planetary gear system 200 of the present invention provides hardening at the location with the highest wear, the posts that the pinions are mounted on, while providing flexibility elsewhere. Further, the hardening can be conducted by, e.g., tempering and quenching, carbonization, surface hardening in situ, nitriding, or local hardening, and will generally have a hardness of greater than, e.g., RC55 or higher steel. The hardened exterior surface 206a, 206b (not visible), 206c, 206d, etc. of the posts 202a, 202b, 202c, 202d, etc. can be hardened by disposing a hardening coating disposed on the posts 202a, 202b, 202c, 202d, etc. or implanting a hardening material into the posts 202a, 202b, 202c, 202d, etc.

Now also referring to FIGS. 2 and 3, the planetary gear system 200 can be disposed within a main rotor gearbox 114 within a fuselage 102 of an aircraft 100. The main rotor gearbox 114 couples the one or more engines 120a, 120b to the rotor mast 112 of the rotorcraft 100. The gear 210 at the top of the planetary gear carrier 204 engages the rotor mast 112 or other torque-carrying component. A planetary sun gear (not depicted) is disposed within the main rotor gearbox 114 between and engaging the planet pinion gears 212. A compound bull gear 208 is disposed within the main rotor gearbox 114, engages the planetary sun gear (not depicted), and is coupled to the one or more engines 120a, 120b. Note that various gears and/or sets of gears (not depicted) within the main rotor gearbox 114 can be used to couple the one or more engines 120a, 120b to the compound bull gear 208 and/or auxiliary systems. Moreover, one or more reduction gearboxes 216a, 216b can couple the one or more engines 120a, 120b to the main rotor gearbox 114.

Figure 4:
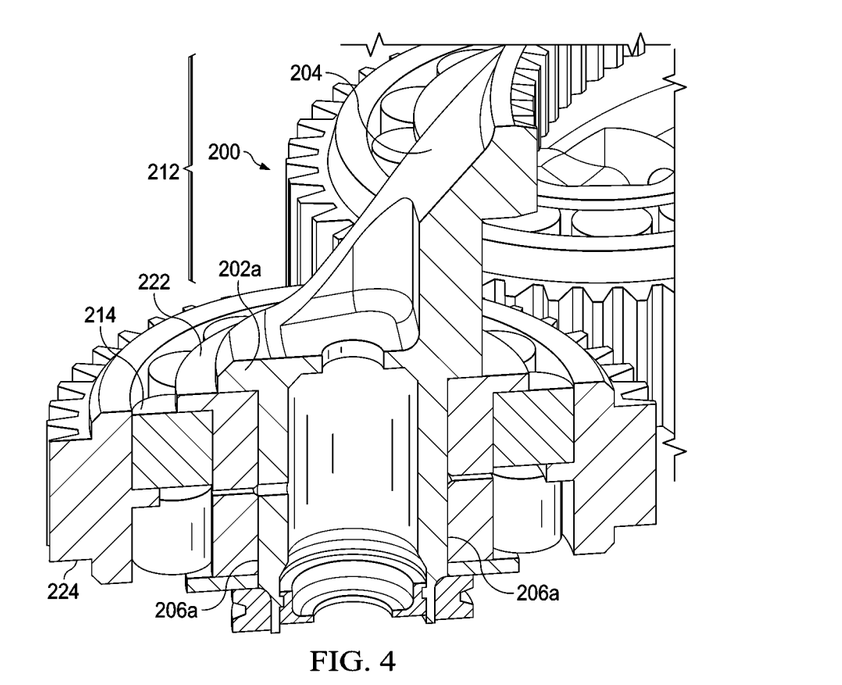
FIG. 4 is a close-up, cross-sectional view of the integral post and gears of the planetary gear of the present application.

FIG. 4 is a close-up, cross-sectional view of an integral post 202a and gears 224 of the planetary gear system 200 of the present invention. The post 202a is shown being integral with the planetary gear carrier 204. The external surface 206a and portions of the post 202a adjacent the external surface 206a are hardened to extend the life of the overall planetary gear system 200. The hardened external surface 206a of the post 202a, contacts a bearing system that includes race 222, bearings 214, and the gear 224, the combination of which forms each planet pinion gear 212. Note that the planet pinion gear 212 can be referred to as a planet pinon gear assembly. As shown, the race 222 of planet pinion gear 212 contacts the post 202a. In other embodiments, the bearings 214, gear 224 or other components could contact the post 202a. As a result, the present invention reduces wear on the posts caused the planet pinion gears or any component thereof.

Figure 5:
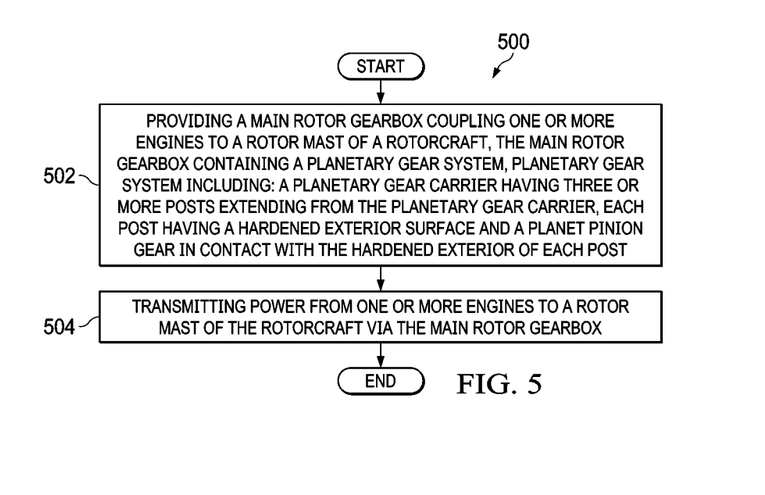
FIG. 5 shows a flow chart of a method according to an embodiment of the present application.

FIG. 5 illustrates a method embodiment of the present invention. Method 500 includes providing power to a rotorcraft 100 by providing a main rotor gearbox 114 coupling one or more engines 120a, 120b to a rotor mast 112 of the rotorcraft 100 in block 502, and transmitting a power from the one or more engines 120a, 120b to the rotor mast 112 of the rotorcraft 100 via the main rotor gearbox 114 in block 504. The main rotor gearbox 114 contains a planetary gear system 200 including a planetary gear carrier 204 having three or more posts 202a, 202b, 202c, 202d, etc. extending from the planetary gear carrier 204, each post 202a, 202b, 202c, 202d, etc. having a hardened exterior surface 206a, 206b, 206c, 206d, etc., and a planet pinion gear 212 or any component thereof in contact with the hardened exterior surface 206a, 206b, 206c, 206d, etc. of each post 202a, 202b, 202c, 202d, etc.

For metals, hardness is generally defined as the resistance of metal to deformation, usually by indentation. However, the hardness of the metal may also refer to stiffness, temper, resistance to scratching, resistance to abrasion, or resistance to cutting. It is a property of metals that, when a load is applied, they have the ability to resist being permanently deformed. Different types of metal deformation include: bending, breaking, scratching, and/or a change to the shape of the metal. The greater the hardness of the metal, the greater resistance it has to these types of deformation. In metallurgy, the hardness of a metal or "indentation hardness" is the resistance of a material to indentation. A typical hardness test involves the use of a pointed or rounded indenter is pressed into a surface under a substantially static load.

There are three types of tests commonly used with accuracy by the metallurgic industry: (1) the Brinell hardness test, (2) the Rockwell hardness test, and (3) the Vickers hardness test. Since the definitions of metallurgic strength and hardness are very similar, it is generally assumed that a strong metal is also a hard metal. Rockwell Hardness is a hardness measurement based on the net increase in depth of impression as a load is applied. Hardness numbers have no units and are commonly given in the R, L, M, E and K scales. The higher the number in each of the scales means the harder the material. Brinell hardness is determined by forcing a hard steel or carbide sphere of a specified diameter under a specified load into the surface of the metal followed measuring the diameter of the indentation left after the test. The Brinell hardness number (Brinell number or BHN), is obtained by dividing the load in kilograms by the actual surface area of the indentation, in square millimeters. The Vickers Hardness test is conducted by subjecting the surface of the metal to a standard pressure for a standard length of time by means of a pyramid-shaped diamond.

It will be understood that particular embodiments described herein are shown by way of illustration and not as limitations of the invention. The principal features of this invention can be employed in various embodiments without departing from the scope of the invention. Those skilled in the art will recognize, or be able to ascertain using no more than routine experimentation, numerous equivalents to the specific procedures described herein. Such equivalents are considered to be within the scope of this invention and are covered by the claims.

All publications and patent applications mentioned in the specification are indicative of the level of skill of those skilled in the art to which this invention pertains. All publications and patent applications are herein incorporated by reference to the same extent as if each individual publication or patent application was specifically and individually indicated to be incorporated by reference.

The use of the word "a" or "an" when used in conjunction with the term "comprising" in the claims and/or the specification may mean "one," but it is also consistent with the meaning of "one or more," "at least one," and "one or more than one." The use of the term "or" in the claims is used to mean "and/or" unless explicitly indicated to refer to alternatives only or the alternatives are mutually exclusive, although the disclosure supports a definition that refers to only alternatives and "and/or." Throughout this application, the term "about" is used to indicate that a value includes the inherent variation of error for the device, the method being employed to determine the value, or the variation that exists among the study subjects.

As used in this specification and claim(s), the words "comprising" (and any form of comprising, such as "comprise" and "comprises"), "having" (and any form of having, such as "have" and "has"), "including" (and any form of including, such as "includes" and "include") or "containing" (and any form of containing, such as "contains" and "contain") are inclusive or open-ended and do not exclude additional, unrecited elements or method steps. In embodiments of any of the compositions and methods provided herein, "comprising" may be replaced with "consisting essentially of" or "consisting of". As used herein, the phrase "consisting essentially of" requires the specified integer(s) or steps as well as those that do not materially affect the character or function of the claimed invention. As used herein, the term "consisting" is used to indicate the presence of the recited integer (e.g., a feature, an element, a characteristic, a property, a method/process step or a limitation) or group of integers (e.g., feature(s), element(s), characteristic(s), propertie(s), method/process steps or limitation(s)) only.

The term "or combinations thereof" as used herein refers to all permutations and combinations of the listed items preceding the term. For example, "A, B, C, or combinations thereof" is intended to include at least one of: A, B, C, AB, AC, BC, or ABC, and if order is important in a particular context, also BA, CA, CB, CBA, BCA, ACB, BAC, or CAB. Continuing with this example, expressly included are combinations that contain repeats of one or more item or term, such as BB, AAA, AB, BBC, AAABCCCC, CBBAAA, CABABB, and so forth. The skilled artisan will understand that typically there is no limit on the number of items or terms in any combination, unless otherwise apparent from the context.

As used herein, words of approximation such as, without limitation, "about", "substantial" or "substantially" refers to a condition that when so modified is understood to not necessarily be absolute or perfect but would be considered close enough to those of ordinary skill in the art to warrant designating the condition as being present. The extent to which the description may vary will depend on how great a change can be instituted and still have one of ordinary skilled in the art recognize the modified feature as still having the required characteristics and capabilities of the unmodified feature. In general, but subject to the preceding discussion, a numerical value herein that is modified by a word of approximation such as "about" may vary from the stated value by at least ±1, 2, 3, 4, 5, 6, 7, 10, 12 or 15%.

All of the devices and/or methods disclosed and claimed herein can be made and executed without undue experimentation in light of the present disclosure. While the devices and/or and methods of this invention have been described in terms of preferred embodiments, it will be apparent to those of skill in the art that variations may be applied to the compositions and/or methods and in the steps or in the sequence of steps of the method described herein without departing from the concept, spirit and scope of the invention. All such similar substitutes and modifications apparent to those skilled in the art are deemed to be within the spirit, scope and concept of the invention as defined by the appended claims.

Furthermore, no limitations are intended to the details of construction or design herein shown, other than as described in the claims below. It is therefore evident that the particular embodiments disclosed above may be altered or modified and all such variations are considered within the scope and spirit of the disclosure. Accordingly, the protection sought herein is as set forth in the claims below.

To aid the Patent Office, and any readers of any patent issued on this application in interpreting the claims appended hereto, applicants wish to note that they do not intend any of the appended claims to invoke paragraph 6 of 35 U.S.C. § 112 as it exists on the date of filing hereof unless the words "means for" or "step for" are explicitly used in the particular claim.

What is claimed is:

1. A planetary gear system for a rotorcraft comprising:
a planetary gear carrier of a rotorcraft main rotor gearbox having three or more posts extending from the planetary gear carrier, each post having a hardened exterior surface, wherein the hardened exterior surface of each post is hardened in situ, and wherein the planetary gear carrier is flexible; and
a respective planet pinion gear in contact with the hardened exterior surface of each post.

2. The planetary gear system of claim 1, wherein each planet pinion gear comprises a bearing system, the bearing system comprising a race and a plurality of bearings, wherein the bearing system is in contact with the hardened exterior surface of the post.

3. The planetary gear system of claim 1, wherein the hardened exterior surface of each post is hardened by tempering and quenching, carbonization, nitriding, or local hardening.

4. The planetary gear system of claim 1, wherein the hardened exterior surface of each post comprises a hardening coating disposed on the post or a hardening material implanted into the post.

5. The planetary gear system of claim 1, wherein the planetary gear carrier comprises a single piece planetary gear carrier and the posts are integral with the single piece planetary gear carrier.

6. The planetary gear system of claim 1, further comprising:
a planetary sun gear disposed between and engaging the planet pinion gears; and
a bull gear connected to the planetary sun gear.

7. The planetary gear system of claim 1, wherein the planetary gear carrier is configured such that each of the three or more posts extends from a respective portion of the planetary gear carrier such that a portion of each planet pinion gear extends radially outwardly from an outermost point of the planetary gear carrier.

8. The planetary gear system of claim 1, wherein the hardened exterior surface of each post reduces wear on the respective post caused by the planet pinion gears or any component thereof.

9. A method of providing power to a rotorcraft comprising:
providing a rotorcraft main rotor gearbox coupling one or more engines to a rotor mast of the rotorcraft, wherein the main rotor gearbox contains a planetary gear system comprising:
a planetary gear carrier of the main rotor gearbox having three or more posts extending from the planetary gear carrier, each post having a hardened exterior surface, wherein the hardened exterior surface of each post is hardened in situ, and wherein the planetary gear carrier is flexible, and
a respective planet pinion gear in contact with the hardened exterior surface of each post; and
transmitting a power from the one or more engines to the rotor mast of the rotorcraft via the main rotor gearbox.

10. The method of claim 9, wherein each planet pinion gear comprises a bearing system, the bearing system comprising a race and a plurality of bearings, wherein the bearing system is in contact with the hardened exterior surface of each post.

11. The method of claim 9, further comprising hardening the hardened exterior surface of each post by tempering and quenching, carbonization, nitriding, or local hardening.

12. The method of claim 9, further comprising hardening the hardened exterior surface of the post by coating the post with a hardening coating or implanting a hardening material into each post.

13. The method of claim 9, wherein the planetary gear carrier comprises a single piece planetary gear carrier and the posts are integral with the single piece planetary gear carrier.

14. The method of claim 9, further comprising reducing wear on the posts caused by the planet pinion gears or any component thereof as a result of using the hardened exterior surface of each post.

15. A rotorcraft, comprising:
a fuselage;
one or more engines disposed within the fuselage; and a rotorcraft main rotor gearbox disposed within the fuselage and coupling the one or more engines to a rotor mast of the rotorcraft, wherein the main rotor gearbox contains a planetary gear system comprising:
- a planetary gear carrier of the main rotor gearbox having three or more posts extending from the planetary gear carrier, wherein the planetary gear carrier is flexible, each post having a hardened exterior surface, wherein the hardened exterior surface of each post is hardened in situ, and a gear disposed radially inwardly of the planetary gear carrier engaging the rotor mast or other torque-carrying component,
- a respective planet pinion gear in contact with the hardened exterior surface of each post,
- a planetary sun gear disposed within the main rotor gearbox between and engaging the planet pinion gears, and
- a bull gear disposed within the main rotor gearbox, engaging the planetary sun gear, and coupled to the one or more engines.

16. The rotorcraft of claim 15, wherein each planet pinion gear comprises a bearing system, the bearing system comprising a race and a plurality of bearings, wherein the bearing system is in contact with the hardened exterior surface of each post.

17. The rotorcraft of claim 15, wherein the hardened exterior surface of each post is hardened by tempering and quenching, carbonization, nitriding, or local hardening.

18. The rotorcraft of claim 15, wherein the hardened exterior surface of each post comprises a hardening coating disposed on each post or a hardening material implanted into each post.

19. The rotorcraft of claim 15, wherein the planetary gear carrier comprises a single piece planetary gear carrier and the posts are integral with the single piece planetary gear carrier.

20. The rotorcraft of claim 15, wherein the planetary gear carrier is configured such that each of the three or more posts extends from a respective portion of the planetary gear carrier such that a portion of each planet pinion gear extends radially outwardly from an outermost point of the planetary gear carrier.

21. The rotorcraft of claim 15, wherein the hardened exterior surface of each post reduces wear on the respective post caused by the planet pinion gears or any component thereof.

22. The rotorcraft of claim 15, wherein the one or more engines are coupled to the main rotor gearbox.

* * * * *